United States Patent
Matsushita

(10) Patent No.: US 10,814,333 B2
(45) Date of Patent: Oct. 27, 2020

(54) PULVERIZING APPARATUS WITH HIGH PROCESSING CAPABILITY AND A METHOD FOR PRODUCING FINE PAPER POWDER

(71) Applicant: ECO RESEARCH INSTITUTE LTD., Tokyo (JP)

(72) Inventor: Takamichi Matsushita, Tokyo (JP)

(73) Assignee: ECO RESEARCH INSTITUTE LTD., Tokyo (JP)

( * ) Notice: Subject to any disclaimer, the term of this patent is extended or adjusted under 35 U.S.C. 154(b) by 466 days.

(21) Appl. No.: 15/305,204

(22) PCT Filed: Dec. 24, 2015

(86) PCT No.: PCT/JP2015/086036
§ 371 (c)(1),
(2) Date: Oct. 19, 2016

(87) PCT Pub. No.: WO2016/125413
PCT Pub. Date: Aug. 11, 2016

(65) Prior Publication Data
US 2017/0182498 A1 Jun. 29, 2017

(51) Int. Cl.
*B02C 18/14* (2006.01)
*B02C 23/16* (2006.01)
(Continued)

(52) U.S. Cl.
CPC .......... *B02C 18/145* (2013.01); *B02C 18/144* (2013.01); *B02C 18/2216* (2013.01);
(Continued)

(58) Field of Classification Search
CPC ..... B02C 18/145; B02C 18/22; B02C 18/188; B02C 2018/188; B02C 2018/147;
(Continued)

(56) References Cited

U.S. PATENT DOCUMENTS 2,789,942 A * 4/1957 Cooper, Jr. ............. C10B 55/10
208/127
4,239,160 A * 12/1980 Hawkins ............... B02C 18/186
241/222

(Continued)

FOREIGN PATENT DOCUMENTS

JP 2000-093826 4/2000
JP 2001-088125 4/2001
(Continued)

OTHER PUBLICATIONS

Translation of JP 2001-088125 to Shigeru (Year: 2001).*
Translation of JP 62-294317 to Uchimura (Year: 1987).*
Translation of JP 2011-045866 to Takamichi (Year: 2011).*
International Search Report, dated Apr. 5, 2016 (Apr. 5, 2016).

*Primary Examiner* — Elaine Gort
*Assistant Examiner* — Christopher B Wehrly
(74) *Attorney, Agent, or Firm* — Rankin, Hill & Clark LLP

(57) ABSTRACT

Provided is a pulverizing apparatus (100) including a pulverization chamber (110) provided with a plurality of stationary blades (111) on an inner peripheral surface, a rotary shaft (120) rotatably supported by the pulverization chamber (110), a plurality of rotary plates (130) fixed to the rotary shaft (120) and separated with intervals in the horizontal direction, and having a plurality of a rotary blades (131) on an outer peripheral surface, tip ends of the rotary blades (131) having space of 0.3 to 0.5 mm between tip ends of the stationary blades (111), a paper powder feed port (140) to which paper powder is fed, a rotation driving unit (150) which rotates the rotary shaft (120) so that a peripheral speed of the tip ends of the rotary blades (131) is 19 to 30 m/sec, and a screen (160) arranged inside the pulverization chamber (110) having mesh openings of 130 to 400 μm.

8 Claims, 5 Drawing Sheets

(51) Int. Cl.
*B02C 18/22* (2006.01)
*B02C 23/08* (2006.01)
*B02C 18/18* (2006.01)

(52) U.S. Cl.
CPC .......... *B02C 18/2225* (2013.01); *B02C 23/08* (2013.01); *B02C 23/16* (2013.01); *B02C 2018/188* (2013.01); *B02C 2023/165* (2013.01)

(58) Field of Classification Search
CPC ......... B02C 23/08; B02C 23/10; B02C 23/16; B02C 23/165; D21D 1/02–18
USPC .......................................... 241/24.29, 68, 79
See application file for complete search history.

(56) References Cited

U.S. PATENT DOCUMENTS

| | | | | |
|---|---|---|---|---|
| 7,083,130 | B2 * | 8/2006 | Tomikawa | ............ B02C 17/185 |
| | | | | 241/79 |
| 2006/0289685 | A1 * | 12/2006 | Graham | .................. B02C 19/06 |
| | | | | 241/39 |
| 2009/0224086 | A1 * | 9/2009 | Hata | ....................... B02C 15/14 |
| | | | | 241/28 |
| 2012/0061498 | A1 * | 3/2012 | Pallmann | .............. B02C 18/144 |
| | | | | 241/73 |

FOREIGN PATENT DOCUMENTS

| | | |
|---|---|---|
| JP | 2011-045866 | 3/2011 |
| JP | 2012-250854 | 12/2012 |

* cited by examiner

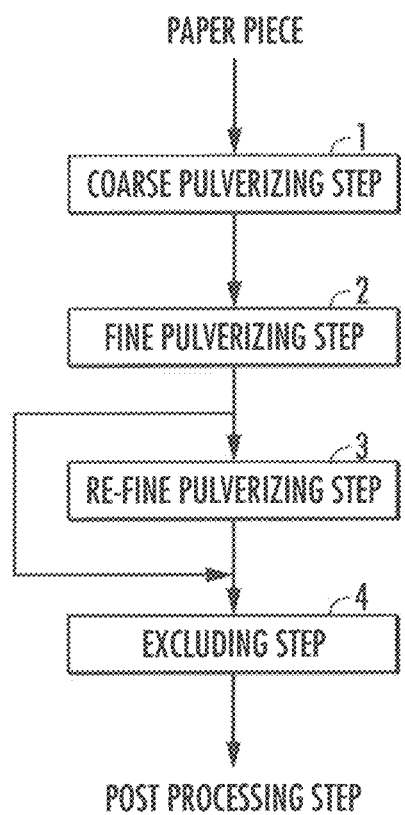
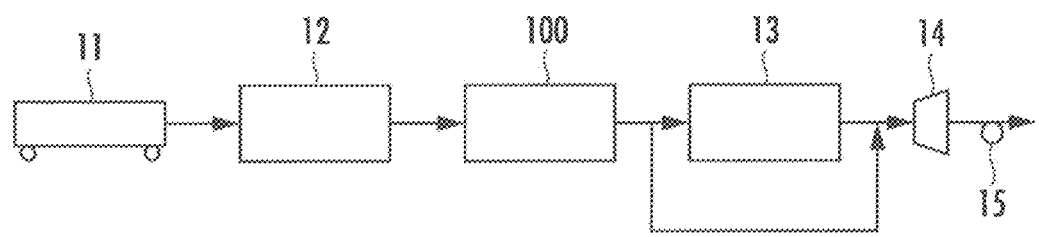

PULVERIZING APPARATUS WITH HIGH PROCESSING CAPABILITY AND A METHOD FOR PRODUCING FINE PAPER POWDER

TECHNICAL FIELD

The present invention relates to a pulverizing apparatus and a fine paper powder manufacturing method for producing fine paper powder.

BACKGROUND ART

Nowadays, large amounts of waste paper are discarded from offices, publication houses, paper manufacturing companies, and the like. In general, at a stage during processing paper from wood, paper receives a high degree of processing in order to render cellulose fibers finely softened, and paper is a functional material having a value-added structure. Therefore, waste paper is also a functional material having a value-added structure, and in addition, waste paper is a material that is effectively zero in terms of its environmental impact. Consequently, proposals have been made for using resin compositions containing paper, in which pulverized waste paper is mixed in the resin, for molding process materials.

However, when a large-sized paper powder is contained, in a case of injection molding a complicatedly designed product with a fine structure, the crushed paper which does not exhibit fluidity even by heating thereof, disrupts the smooth flow of the resin composition, so that defects such as filling failures occur easily, and due to poor pattern transferability, high quality molded products with good yield cannot be obtained. In this regard, it is necessary to maintain the paper powder contained in the resin composition containing paper to be fine so as to have a maximum particle diameter of about 100 μm or less.

For example, Patent Document 1 discloses a method for producing fine paper powder as above. This method includes a first fine pulverization step for pulverizing coarsely ground paper powder using a vertical roller mill or a drug research mill to obtain fine paper powder with an average particle diameter of 50 μm or more to less than 150 μm, and a second fine pulverization step for pulverizing fine paper powder, wherein fine paper powder with an average particle diameter of 25 μm or more to less than 50 μm is mixed with the fine paper powder obtained in the first fine pulverization step, using the vertical roller mill or the drug research mill to obtain fine paper powder with the average particle diameter of 25 μm or more to less than 50 μm.

PRIOR ART DOCUMENTS

Patent Document

Patent Document 1: Japanese Patent No. 4904389

SUMMARY OF THE INVENTION

Problems to be Solved by the Invention

The producing method disclosed in Patent Document 1 realized a large improvement of processing capability compared to the conventional method of pulverization by a single step using the vertical roller mill or the drug research mill. However, the demand of resin composition which includes fine paper powder is extremely increasing these days, and further mass production of the fine paper powder as the raw material has been desired.

In view of the above, it is an object of the present invention to provide a pulverizing apparatus with high processing capability and a method for producing fine paper powder.

Means for Solving the Problem

The pulverizing apparatus of the present invention is characterized in including: a pulverization chamber which has a plurality of stationary blades at an inner peripheral surface thereof, the plurality of stationary blades extending in an axial direction and being separated by intervals in a peripheral direction; a rotary shaft which is rotatably supported by the pulverization chamber; a plurality of rotary blades fixed to the rotary shaft so as to oppose the stationary blades, and tip ends thereof having space of 0.1 mm or more to 0.5 mm or less between tip ends of the stationary blades; a paper powder feed port to which paper powder is fed into the pulverization chamber; a rotation driving unit which rotates the rotary shaft so that a peripheral speed of the tip ends of the rotary blades is 19 m/sec or more to 30 m/sec or less; and a screen arranged inside or outside the pulverization chamber and having a mesh opening of 130 μm or more to 400 μm or less.

Conventionally, there is known a pulverizer which coarsely pulverizes fiber or the like by using stationary blades arranged in substantially cylindrical shape and rotary blades arranged so as to oppose the stationary blades. However, this pulverizer has a wide space between the tip ends of the stationary blades and the tip ends of the rotary blades, and the peripheral speed of the tip ends of the rotary blades are about 10 m/sec, which can only pulverize to about several millimeters.

The inventors of the present invention has found to enable minute pulverization of paper powder by a similar structure with the conventional pulverizer through performing experiments for many years by changing the configuration of the pulverizer, operation conditions, or the like, and have arrived at the present invention by further various considerations so as to obtain the fine paper powder with high yield.

Specifically, the present invention has been made on the basis of a new knowledge that fine paper powder having a maximum particle diameter of 600 μm or less can be obtained, and high yield of fine paper powder having a maximum particle diameter of 100 μm or less can be obtained by setting the space between the tip ends of the stationary blades and the tip ends of the rotary blades to 0.1 mm or more to 0.5 mm or less and also by rotating the rotary shaft so that the peripheral speed of the tip ends of the rotary blades is 19 m/sec or more to 30 m/sec or less.

By doing so, it is able to obtain fine paper powder having the maximum particle diameter regulated according to the mesh opening of the screen with high yield. Furthermore, since the rotary shaft is rotated at a high speed as described above, an excellent processing capability is achieved. The screen may be provided inside the pulverization chamber or may be provided outside.

Here, if only the space between the tip ends of the stationary blades and the tip ends of the rotary blades is narrowed to 0.1 mm or more to 0.5 mm or less, the fine paper powder is bitten in this space, and a problem of requiring some time for maintenance to resolve this biting will occur. In the present invention, since the peripheral speed of the tip ends of the rotary blades is made much faster compared to the conventional art, high-speed airflow is generated in the pulverization chamber, and it is conceived that the biting is resolved by this high-speed airflow.

Moreover, if only the rotation speed is increased so that the peripheral speed of the tip ends of the rotary blades is 19 m/sec or more to 30 m/sec or less, it is not able to refine the particle diameter of the fine paper powder.

Here, when the space between the tip ends of the stationary blades and the tip ends of the rotary blades is 0.1 mm or more to less than 0.3 mm, there are cases where biting occurs depending on the paper quality although at a low frequency.

Therefore, it is preferable in the pulverizing apparatus of the present invention that the space between the tip ends of the stationary blades and the tip ends of the rotary blades is 0.3 mm or more to 0.5 mm or less.

Furthermore, when the rotary shaft is rotated so that the peripheral speed of the tip ends of the rotary blades is 10 msec or more to less than 19 msec, there is a problem that fine paper powder having a maximum particle diameter of 100 μm or less cannot be particularly obtained with high yield. Moreover, even when the rotary shaft is rotated so that the peripheral speed of the tip ends of the rotary blades exceeds 31 msec, the yield of fine paper powder with the maximum particle diameter of 100 μm or less and the pulverization processing capability do not particularly change, which is not preferable from the view point of energy efficiency.

Therefore, it is preferable in the pulverizing apparatus of the present invention that the rotation driving unit rotates the rotary shaft so that the peripheral speed of the tip ends of the rotary blades is 19 msec or more to 30 msec or less.

According to the pulverizing apparatus of the present invention, it is preferable to include: an accumulation chamber in which paper powder pulverized in the pulverization chamber and passed through the screen is accumulated; a discharge port formed on one side of the accumulation chamber; a suction part which sucks air inside the accumulation chamber via the discharge port; a communication passage which is formed on the other side of the accumulation chamber and which communicates an inside of the accumulation chamber and outside; an opening and closing valve arranged at the communication passage; and an intermittent operation part which opens and closes the opening and closing valve.

In this case, in a state the opening and closing valve is closed, inside the accumulation chamber becomes a negative pressure by the suction of the suction part. In such state, when the opening and closing valve is opened by the intermittent operation part, air from outside abruptly flows into the accumulation chamber through the communication passage, and the paper powder accumulated in the accumulation chamber is moved to the discharge port side. This enables to well discharge the paper powder inside the accumulation chamber from the discharge port.

Moreover, if air or the like is forcibly flown into the accumulation chamber from outside by an air pump or the like, or the air inside the accumulation chamber is sucked by a suction pump or the like, thereby making the pressure inside the accumulation chamber to be negative, there is a concern that the fine paper powder soars up to cause clogging of the screen or a concern that the fine paper powder escapes to the outside of the apparatus. However, such concern is prevented.

Moreover, since an air pump to blow air into the accumulation chamber or a suction pump to make the pressure inside the accumulation chamber to be negative is not necessary, the configuration is simple.

A method for producing fine paper powder of the present invention is a method for producing fine paper powder using a pulverizing apparatus including a pulverization chamber which has a plurality of stationary blades at an inner peripheral surface thereof, the plurality of stationary blades extending in an axial direction and being separated by intervals in a peripheral direction, a rotary shaft which is rotatably supported by the pulverization chamber, a plurality of rotary blades fixed to the rotary shaft so as to oppose the stationary blades, tip ends thereof having space of 0.1 mm or more to 0.5 mm or less between tip ends of the stationary blades, and a paper powder feed port to which paper powder is fed into the pulverization chamber, the method including, a fine pulverizing step for rotating the rotary shaft so that a peripheral speed of the tip ends of the rotary blades is 19 m/sec or more to 30 m/sec or less, and obtaining fine paper powder discharged by passing through a screen arranged inside or outside the pulverization chamber and having a mesh opening of 130 μm or more to 400 μm or less.

According to the method for producing fine paper powder of the present invention, as described above, it becomes possible to obtain fine paper powder having the maximum particle diameter regulated by the mesh opening with high yield.

However, it is difficult to obtain fine paper powder with the maximum particle diameter of 100 μm or less with high yield according to such fine pulverizing step.

Therefore, in the method for producing fine paper powder of the present invention, it is preferable to include a re-fine pulverizing step to obtain fine paper powder with a maximum particle diameter of 25 μm or more to 100 μm or less by pulverizing the fine paper powder obtained in the fine pulverizing step by using a grinding type pulverizer.

In such case, since the fine paper powder with a maximum particle diameter of 25 μm or more to 100 μm or less is obtained by 2 steps of the fine pulverizing step and the re-fine pulverizing step, the energy efficiency is high as a whole and also enables to achieve high yield.

Moreover, in the method for producing fine paper powder according to the present invention, the paper powder is formed of paper having a maximum particle diameter of 1 mm or more to 5 mm or less and having a resin layer on at least one surface thereof.

Conventionally, it was difficult to fine pulverize paper having a resin layer such as laminated paper or the like. However, according to the present invention, as shown in the Example described later, although inferior in processing capability compared to the case of fine pulverizing normal paper, it is possible to favorably fine pulverize with high yield.

Moreover, in the method for producing fine paper powder according to the present invention, it is preferable to include an excluding step for excluding, from fine paper powder obtained in the fine pulverizing step or the re-fine pulverizing step, by using a classifier including a screen having a mesh opening corresponding to a predetermined maximum particle diameter, fine paper powder exceeding the maximum particle diameter.

In such case, it is possible to surely prevent the fine paper powder exceeding the predetermined maximum particle diameter from flowing to the later step.

BRIEF DESCRIPTION OF THE DRAWINGS

FIG. 3 is a block diagram illustrating a method for producing fine paper powder according to the embodiment of the present invention;

FIG. 4 is a step chart showing a method for producing fine paper powder;

FIG. 6A, FIG. 6B, and FIG. 6C are photographs observed by microscopes, in which FIG. 6A is a photograph of coarsely pulverized paper powder, FIG. 6B is a photograph of fine pulverized fine paper powder, and FIG. 6C is a photograph of fine paper powder which is obtained by re-fine pulverizing the fine paper powder.

DESCRIPTION OF EMBODIMENT

Figure 1:
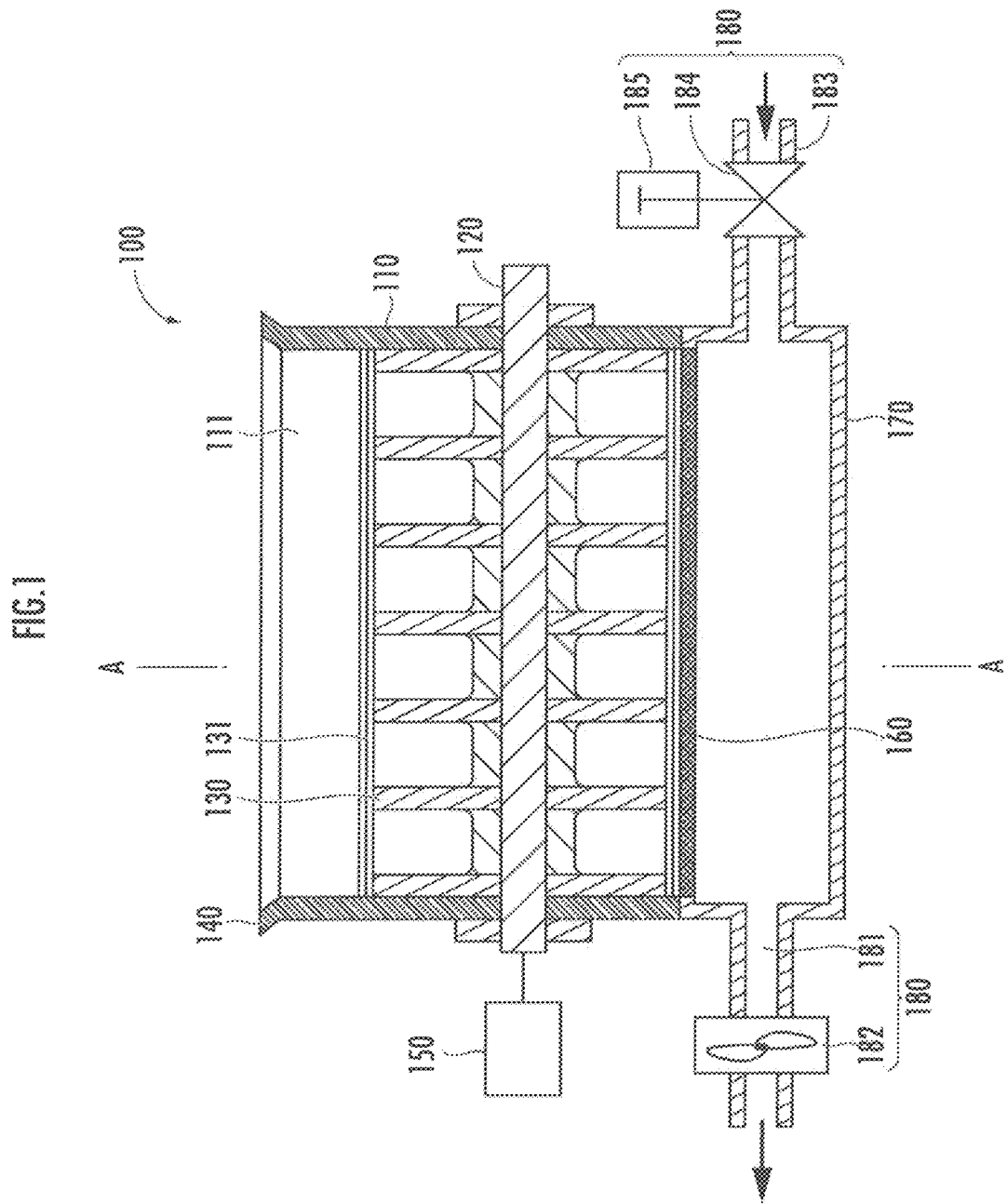
FIG. 1 is an outline side view showing a pulverizing apparatus according to an embodiment of the present invention.

A pulverizing apparatus 100 according to an embodiment of the present invention shall be described below with reference to FIG. 1 and FIG. 2.

The pulverizing apparatus 100 is rotary shearing type pulverizer having a pulverization chamber 110, a rotary shaft 120, a rotary plate 130, a paper powder feed port 140, a rotation driving unit 150, a screen 160, and an accumulation chamber 170.

The pulverization chamber 110 has a substantially cylindrical shape as a whole. Plurality of stationary blades is fixed to the inner peripheral surface of the pulverization chamber 110. Here, the stationary blades 111 are arranged in 6 rows in the axial direction except in the upper and lower portions while being separated by intervals in the peripheral direction.

The rotary shaft 120 is rotatably supported by the cylindrical pulverization chamber 110.

A plurality of, five in this embodiment, rotary blade attaching plates 130 are fixed to the rotary shaft 120 by being separated by intervals in the horizontal direction. A plurality of, sixteen in this embodiment, rotary blades 131 are fixed to the outer peripheral surface so as to extend over all the rotary blade attaching plates 130. As such, the stationary blades 111 and the rotary blades 131 are arranged so as to oppose each other. However, the number of the stationary blades 111 and the number of the rotary blades 131 do not have to be the same.

Although the details are not illustrated, the rotary blades 131 are fixed to the rotary blade attaching plates 130 by a bolt, and it is able to adjust the blade height or exchange the blade. A very small space of 0.1 mm or more to 0.5 mm or less, more preferably, 0.3 mm or more to 0.5 mm or less, exists between the tip ends of the stationary blades 111 and the rotary blades 131. By adjusting this space, it is able to change the particle diameter of the fine paper powder obtained by the pulverizing apparatus 100. For adjusting this space, the blade height of the stationary blades 111 may be adjustable, and in such case, the blade height of the rotary blades 131 may be non-adjustable.

Moreover, the five rotary blade attaching plates 130 may be integrated. Furthermore, the rotary blade attaching plates 130 may be integrated with the rotary shaft 120.

An opening is formed on the upper part of the pulverization chamber 110, which is the paper powder feed port 140 to which paper powder is fed.

The rotation driving unit 150 rotates the rotary shaft 120 so that the peripheral speed of the tip ends of the rotary blades 131 is 19 msec or more to 30 msec or less, more preferably, 25 msec or more to 30 msec or less. For example, the rotation driving unit 150 is composed of an electric motor connected to the rotary shaft 120 via a gear or the like, and a control unit configured by a CPU which controls this electric motor, a memory, and the like.

At the lower part of the pulverization chamber 110, an opening is formed along the horizontal direction, and a screen 160 having a mesh corresponding to the preset particle diameter. The mesh opening of the screen 160 is 130 μm or more to 400 μm or less.

An accumulation chamber 170 in which the paper powder passing through the screen 160 is accumulated is arranged under the screen 160.

The pulverizing apparatus 100 further includes a discharge mechanism 180 which discharges the paper powder accumulated in the accumulation chamber 170 to a device at the downstream side. The discharge mechanism 180 includes a discharge port 181, a suction part 182, a communication passage 183, an opening and closing valve 184, and an intermittent operation part 185.

Figure 2:
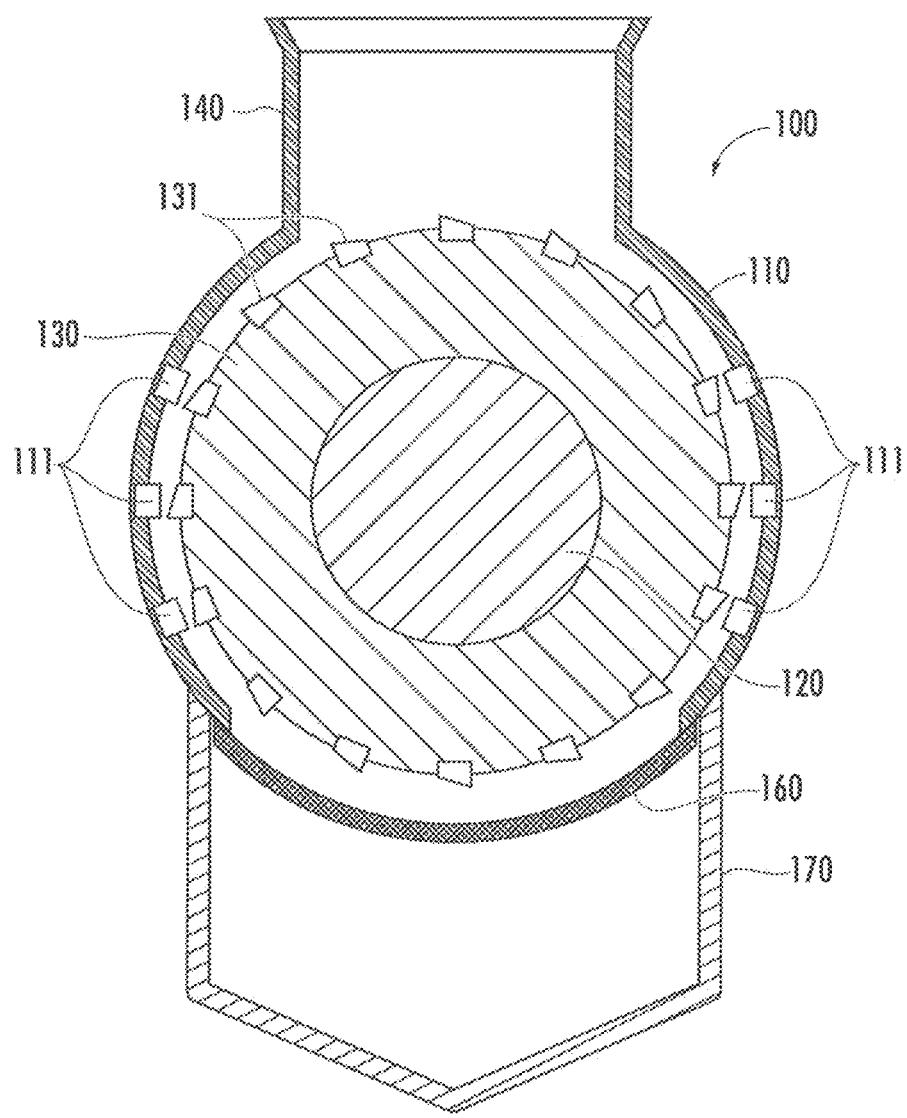
FIG. 2 is a sectional view taken along line A-A of FIG. 1.

An opening is formed as the discharge port 181 at one side in the horizontal direction of the accumulation chamber 170, which is the left side in FIG. 1. Furthermore, the suction part 182 which sucks the air inside the accumulation chamber 170 through the discharge port 181, is provided. The suction part 182 is, for example, a suction fan.

An opening is also formed at the other side in the horizontal direction of the accumulation chamber 170, which is the right side in FIG. 1, and the communication passage 183 which communicates the inside and the outside of the accumulation chamber 170 is connected to this opening. Furthermore, the opening and closing valve 184 is arranged at this communication passage 183.

Furthermore, the intermittent operation part 185 which intermittently opens and closes this opening and closing valve 184, is arranged. The intermittent operation part 185 is, for example, an air cylinder and a control unit configured of a CPU, a memory, and the like for controlling the air cylinder.

In the pulverizing apparatus 100 configured as described above, the coarsely pulverized paper powder is fed into the pulverization chamber 110 from the paper powder feed port 140, and their fibers are shortened and pulverized by receiving the shearing force by the plurality of stationary blades 111 and the rotary blades 131 which is rotated at high speed by the rotary shaft 120 so that the peripheral speed of the tip ends of the rotary blades 131 is 19 m/sec or more to 30 m/sec or less. As passing through the screen 160, the finely pulverized fine paper powder falls in the accumulation chamber 170. On the other hand, the paper powder which cannot pass through the screen 160 is swirled up by the swirling flow generated by the rotation of the rotary blades 131, and pulverized again in the pulverization chamber 110.

In the conventional pulverizer similar to the present pulverizing apparatus 100, the space between the outer peripheral end of the rotary blades and the inner peripheral surface of the pulverization chamber is at least 0.5 mm or more, and also the rotary shaft 120 is rotated so that the fastest peripheral speed of the tip ends of the rotary blades 131 is 11 msec or less. Therefore, it could be only pulverized to have a maximum particle diameter of about several millimeters.

However, according to the present pulverizing apparatus 100, it has become possible to pulverize to obtain fine paper powder having a maximum particle diameter of 25 μm or more to 600 μm or less by making the space between the tip ends of the stationary blades 111 and the tip ends of the rotary blades 131 to be 0.1 mm or more to 0.5 mm or less and also rotating the rotary shaft 120 so that the peripheral speed of the tip ends of the rotary blades 131 is 19 msec or more to 30 msec or less. Moreover, since the rotary shaft 120 is rotated at high speed, the processing capability becomes excellent.

The fine paper powder which has passed through the screen 160 is accumulated in the accumulation chamber 170. Since the rotary shaft 120 is rotated at high speed and the paper powder is finely pulverized in a short time, the pulverizing processing capability of the pulverizing apparatus 100 is high. Therefore, a large amount of fine paper powder is accumulated in the accumulation chamber 170 in a short time. This fine paper powder is accumulated in a manner of having a summit of a mountain at the vicinity of a center portion of the accumulation chamber 170 in the horizontal direction or at a part of a discharge port 181 side from the center portion in the horizontal direction due to the suction by the suction part 182.

When a large amount of fine paper powder is accumulated and the summit of the mountain of fine paper powder reaches the screen 160, the pulverizing processing capability decreases. Moreover, the inner space of the pulverizing apparatus 100 becomes narrow, and there is a concern of increase of temperature. In a case where the fine paper powder is laminated paper or the like, there is a concern that the resin will melt and attach to the screen 160, thereby causing clogging.

In this regard, the pulverizing apparatus 100 includes the discharge mechanism 180. With this discharge mechanism 180, in a state where the opening and closing valve 184 is closed, the inside of the accumulation chamber 170 is negative pressure by the suction of the suction part 182. In this state, when the opening and closing valve 184 is opened by the intermittent operation part 185, air abruptly flows into the accumulation chamber 170 from outside through the communication passage 183, and the paper powder accumulated in the accumulation chamber 170 moves to the discharge port 181 side. According to this, it is possible to favorably discharge the paper powder inside the accumulation chamber 170 from the discharge port 181.

Moreover, since an air pump or the like for sending air inside the accumulation chamber 170 is not necessary, the configuration of the discharge mechanism 180 is simple.

Hereinafter, the method for producing fine paper powder using the pulverizing apparatus 100 described above is explained with reference to FIG. 3 and FIG. 4.

The present method for producing fine paper powder is a method for fine pulverizing waste paper as the raw material and includes a coarse pulverizing step 1, a fine pulverizing step 2, a re-fine pulverizing step 3, and an excluding step 4.

For example, if there is no need to obtain fine paper powder having a particle diameter of 100 μm or less with high yield, the re-fine pulverizing step 3 may be omitted. Accordingly, it is able to configure an inline fine pulverizing system including the coarse pulverizing step 1, the fine pulverizing step 2, and the excluding step 4.

Here, the waste paper includes various types of waste paper from newspapers and magazines, waste paper from printed matter, waste wrapping paper, discarded cardboard boxes, office paper, etc., broken and damaged sheets that occur upon manufacturing of virgin paper, cutting wastage from magazines and the like, grinding powders, shredder scraps, etc. Such waste papers are discarded in great amount from offices, publishing houses, manufacturing companies and the like, and are valued as having a substantially zero negative effect on the environment. Moreover, the waste paper also includes those having a layer such as a resin layer or the like at least on one surface such as remainders of paper cups and the like.

The average particle diameter of fine paper powder was measured by a laser diffraction-type particle size distribution measuring instrument (Mastersizer S Model, made by Marvern Instruments Ltd. or SALD-2300 made by Shimadzu Corporation).

In the coarse pulverizing step 1, using a coarse pulverizing machine 12 such as a roll crusher, a hammer crusher, a cutter mill or the like, waste paper supplied from the raw material supplier 11 such as a supply conveyor or the like is coarsely ground into paper cuttings of 1 mm to several tens millimeters, and more preferably 1 mm to 5 mm square.

In the case that the waste paper comes from damaged or discarded paper in rolls or sheet form, a shearing machine or a cutting machine may be used as the coarse pulverizing machine 12. Further, in the case that the waste paper is already several mm square or less, such as grindings from ground up books, shredder scraps or the like, the coarse pulverizing machine 12 is not necessary.

In the fine pulverizing step 2, the coarse paper powder supplied from the coarse pulverizing machine 12 is pulverized using pulverizing apparatus 100 to obtain fine paper powder containing a lot of fine paper powder having a particle diameter of 25 μm or more to 600 μm or less.

When fine paper powder having a particle diameter of, for example, 100 μm or less with high yield by using the pulverizing apparatus 100, it may be conceived to make the space between the stationary blades 111 and the rotary blades 131 to be small such as less than 0.1 mm. However, by narrowing the space as such, the fine paper powder is bitten and caught in the space, thereby increasing the number of times of maintenance for resolving the biting which deteriorates the pulverizing efficiency. Moreover, if the space is narrowed as such, it becomes necessary to strictly mange the space, which also increases the number of times of maintenance.

Moreover, it can be conceived to increase the rotation speed of the rotary shaft 120 so that the peripheral speed of the tip ends of the rotary blades 131 exceeds 31 msec. However, even if the rotation speed is increased as such, a certain amount of fine paper powder having a particle diameter over 100 μm will continue to remain without being pulverized, and it is not able to obtain fine paper powder having a particle diameter of 100 μm or less with high yield.

As described above, fine paper powder having a maximum particle diameter of 100 μm or less cannot be obtained with high yield by pulverizing using the pulverizing apparatus 100. Moreover, fine paper powder having a maximum particle diameter of 100 μm or less cannot be obtained with high yield by pulverizing only the fine paper powder having the maximum particle diameter exceeding 100 μm again by using the pulverizing apparatus 100. Therefore, it is not preferable from the view point of energy efficiency to obtain fine paper powder having a maximum particle diameter of 100 μm or less by using only the pulverizing apparatus 100.

Therefore, in order to obtain fine paper powder having a maximum particle diameter of 100 μm or less, it is preferable to use a pulverizer appropriate for further micronizing the fine paper powder. This allows better energy efficiency as a whole.

As such a pulverizer, a grinding type pulverizer such as a vertical roller mill, drug research mill, stone type mill, and the like can be used. In the re-fine pulverizing step 3, the fine paper powder pulverized using the pulverizing apparatus 100 in the fine pulverizing step 2, is further pulverized using the grinding type pulverizer 13 to obtain fine paper powder having a maximum particle diameter of 100 µm or less.

Here, the fine paper powder obtained in the fine pulverizing step 2 may be classified by a classifier, and only the fine paper powder having a particle diameter exceeding 100 µm may be pulverized in the re-fine pulverizing step 3. The classifier used is preferably a pneumatic classifier which does not require to resolve the clogging or the like of the mesh and which is easy to maintenance. As the pneumatic classifier, there are gravity type, cyclone type, forced vortex flow type, and the like, and any of those types may be used.

The vertical roller mill is representative of roller mills, and is a roller type grinder, which may also simply be referred to as a "roller mill". The vertical roller mill includes a rotary table disposed inside the cylindrically shaped pulverization chamber and which is rotatably driven by a motor, and a plurality of vertically oriented pulverizing rollers which are arranged to be spaced with intervals in the direction of rotation of the rotary table. As the vertical roller mill, specifically, the one recited in Japanese Patent No, 4904389 can be referred.

The pulverizing rollers are free rollers on which loads are imposed toward the rotary table by means of hydraulic pressure, springs, or the like, and which rotate in following relation to the rotation of the rotary table. Accompanying the rotation of the rotary table, the paper powder is bitten between the lands of the pulverizing rollers and the inner circumferential wall of the pulverization chamber in order to pulverize the paper powder. In place of the rotary table which rotates while supporting the lower portions of the pulverizing rollers, rotary hanging members may be used, which rotate while upper portions of the pulverizing rollers are supported thereby. Further, although recessed grooves may also be formed on the inner circumferential wall of the pulverization chamber, because there is a concern that the paper powder could become collected in the recessed grooves, thereby reducing the pulverizing effect, it is preferred that the inner circumferential surface of the pulverization chamber is kept smooth.

The fine paper powder transferred from the fine pulverizing step 2 is supplied to the interior of the pulverization chamber, and is transferred to the outer circumference of the rotary table by the centrifugal force of the rotary table, and the fine paper powder is bitten between the rotary table and the pulverizing rollers to be mainly pulverized. External air is introduced into the interior of the pulverization chamber and by the upward blowing of the air by vanes, the fine paper powder having become finely pulverized is blown to the upper section of the pulverization chamber.

Here, via a pneumatic classifier disposed in the upper section of the pulverization chamber, fine paper powder having a particle diameter of 100 µm or less is discharged. The particle diameter of the fine paper powder to be discharged can be adjusted by the number of revolution of the rotary vane of the classifier.

Here, in the re-fine pulverizing step 3, a drug research mill or a stone type mill may be used instead of the vertical roller mill. However, the stone type mill is inferior in energy efficiency and may not be preferable.

The drug research mill includes a plurality of disc-shaped rotary rollers, which is disposed inside a housing having an external form of a cylindrical shape and having a bottom portion with a V-shaped circumferential groove, and which is rotated by a motor. The rotary rollers are arranged and spaced with intervals between the groove, and the interval is adjustable.

The fine paper powder supplied to the pulverization chamber is collected inside the groove of the pulverization chamber. The paper powder collected in the groove is pulverized by the rotary rollers. Furthermore, the entangled coarse fine paper powder is centrifuged and untied by the whirling air flow, and the paper powder is pulverized by the collision of the small pieces of paper powder.

In order to finely pulverize the paper powder until obtaining paper powder having a maximum particle diameter of 100 µm or less like the present embodiment, it is preferable to use the vertical roller mill or the drug research mill from the view point of energy efficiency.

In the excluding step 4, among the fine paper powder obtained in the fine pulverizing step 2 or among the fine paper powder obtained by further pulverizing in the re-fine pulverizing step 3, fine paper powder having a maximum particle diameter exceeding a previously set value is excluded by using a classifier 14 which includes a screen having a mesh corresponding to the previously set maximum particle diameter.

As described above, the pulverizing apparatus 100 used in the fine pulverizing step 2 includes a screen 160, and generally, fine paper powder having a size exceeding the mesh opening of the screen 160 does not flow to the downstream. However, there are cases where fine paper powder having a size exceeding the mesh opening of the screen 160 flows to the downstream due to application of unexpected force, breakage of the screen 160, or the like. Moreover, in the re-fine pulverizing step 3, a grinding type pulverizer is used for pulverizing, and therefore the maximum particle diameter is not guaranteed. Therefore, such irregularly large-sized fine paper powder is excluded by using the classifier 14 so that it does not flow to the later step and shipped as a product.

In the excluding step 4, the fine paper powder which is excluded as exceeding the predetermined set value, may be re-pulverized by being returned to the fine pulverizing step 2 or the re-fine pulverizing step 3, or may be disposed.

Figure 5:
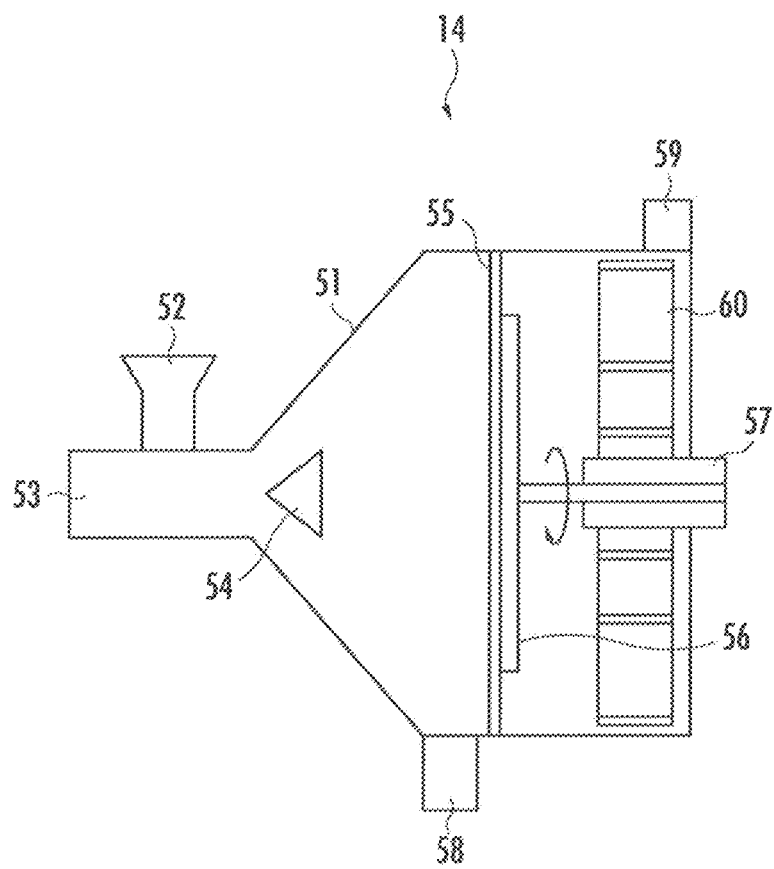
FIG. 5 is a side surface view schematically illustrating an example of a classifier.

The classifier 14 is, for example, a blower sifter. For example, as shown in FIG. 5, such classifier 14 has a classifying space inside, and includes a substantially cone shape cylinder casing 51, a raw material feed port 52 for feeding raw material in which coarse powder and fine powder are mixed from the vertex part of the casing 51, a primary air introducing port 53 for introducing primary air to inside of the casing 51 from the vertex part, a dispersion plate 54 arranged in the vicinity of the vertex part inside the casing 51, a screen 55 arranged inside the casing 51, an air brush 56 which rotates at the rear surface of the screen 55, an air injection part 57 which injects jet air to the rear surface of the screen 55, a coarse powder discharge port 58 which is arranged at the front surface side of the screen 55 and at a lower part of the outer peripheral surface of the casing 51, for discharging coarse powder, a fine powder discharge port 59 arranged at the rear surface side of the screen 55 and the outer peripheral part of the casing 51, for discharging fine paper powder, and an impeller 60 which rotates to generate suction flow.

According to such classifier 14, the raw material is suck by the suction flow generated by the impeller 60, and the raw material is dispersed by the dispersion plate 54, and then reaches the screen 55. The fine powder passing through the screen 55 is discharged from the fine powder discharge port 59. The coarse powder which could not pass through and retained on the screen 55 is blown by the jet air, and falls downward by its self weight.

Moreover, the fine paper powder having the maximum particle diameter equal to or less than the previously set value which is discharged from the fine powder discharge port 59 is suck by the suction machine 15, and transferred to the later step. On the other hand, the fine paper powder having the maximum particle diameter exceeding the previously set value which is discharged from the coarse powder discharge port 58 may be re-pulverized by the pulverizing apparatus 100 or grinding type pulverizer 13, or it may be disposed since the amount is small.

The above explains the embodiment of the present invention with reference to the drawings, however, the present invention is not limited thereto.

For example, a case of fixing sixteen plural rotary blades 13 to each of the five rotary blade attaching plates 130 has been explained. However, the number of rotary blades 131 and the number of rotary blade attaching plates 130 are not limited to this. Moreover, the rotary blades 131 may be fixed to the outer peripheral surface of a cylindrically shaped attachment body which is long in the axial direction.

Moreover, a case of arranging the screen 160 at the lower surface of the pulverization chamber 110 has been explained. However, the screen 160 may be arranged at places other than the lower surface of the pulverization chamber 110, for example, at outer peripheral side surface or left and right side surfaces.

EXAMPLES

Hereinafter, the Examples are shown and explained.

Example 1

In Example 1, pulp sheet having a thickness of approximately 1 mm was used as the paper piece.

Figure 6A:
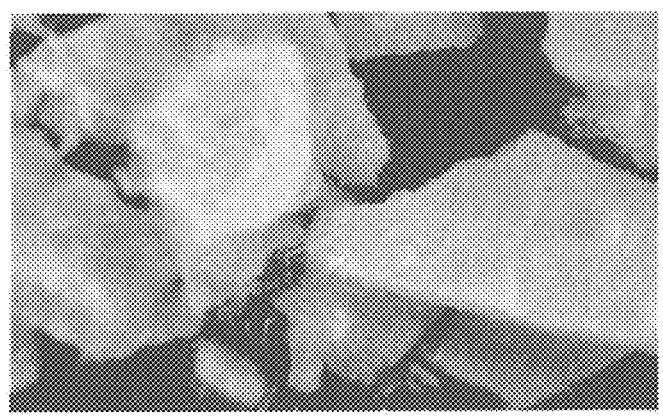

In the coarse pulverizing step 1, this pulp sheet was cut to paper strips of 1 mm or more to 5 mm or less to obtain the coarse paper powder. A photograph of this coarse paper powder observed by a microscope is shown in FIG. 6A.

In the fine pulverizing step 2, the coarse paper powder was pulverized by using a pulverizing apparatus 100 in which the diameter of the virtual circle connecting the tip ends of the rotary blades 131 is 500 mm, and the mesh opening of a mesh 160 is 0.318 mm. The space between the stationary blades 111 and the rotary blades 131 was 0.3 mm and the peripheral speed at the tip ends of the rotary blades 131 was 28 m/sec.

Figure 6B:
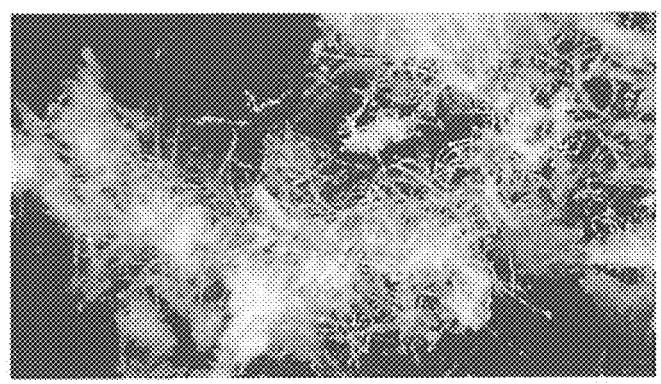

The 10% diameter d10, the 50% diameter (the median diameter) d50, the 90% diameter d90, and the percentage of particle diameter exceeding 100 μm of the obtained fine paper powder, and the obtained amount of the fine paper powder per 1 hour are indicated in Table 1. Here, the 10% diameter d10, 50% diameter d50, and the 90% diameter d90 mean the particle diameter when the integrated % in the particle distribution of the fine paper powder is 10%, 50%, and 90%. The photograph of such fine paper powder observed by the microscope is shown in FIG. 6B.

Moreover, the coarse paper powder was pulverized using the pulverizing apparatus 100 in which the mesh opening of the screen 160 was 0.196 mm. This pulverizing apparatus 100 is the same as the previous pulverizing apparatus 100 except for the mesh opening of the screen 160.

The 10% diameter d10, the 50% diameter (the median diameter) d50, the 90% diameter d90, and the percentage of particle diameter exceeding 100 μm of the obtained fine paper powder using this pulverizing apparatus 100, and the obtained amount of the fine paper powder per 1 hour are also indicated in Table 1.

Furthermore, in the re-pulverizing step 3, the fine paper powder obtained by using the pulverizing apparatus 100 in which the mesh opening of the screen 160 was 0.318 mm was pulverized by using a vertical roller mill.

Figure 6C:

The 10% diameter d10, the 50% diameter (the median diameter) d50, the 90% diameter d90, and the percentage of particle diameter exceeding 100 μm of the obtained fine paper powder using this vertical roller mill, and the obtained amount of the fine paper powder per 1 hour are also indicated in Table 1. The photograph of such fine paper powder observed by the microscope is shown in FIG. 6C.

TABLE 1

|  | d10 (μm) | d50 (μm) | d90 (μm) | Over 100 μm (%) | Obtained amount (kg/hr) |
|---|---|---|---|---|---|
| Pulverizing apparatus 100 Mesh opening 0.318 mm | 19 | 109 | 323 | 52.9 | 243 |
| Pulverizing apparatus 100 Mesh opening 0.196 mm | 16 | 77 | 256 | 40.6 | 200 |
| Vertical roller mill | 13 | 56 | 171 | 29.1 | 30 |

Example 2

In Example 2, fine paper powder was obtained in the same way as Example 1, except that glassine paper having a thickness of approximately 0.03 mm was used as the paper piece. The results are shown in Table 2.

TABLE 2

|  | d10 (μm) | d50 (μm) | d90 (μm) | Over 100 μm (%) | Obtained amount (kg/hr) |
|---|---|---|---|---|---|
| Pulverizing apparatus 100 Mesh opening 0.318 mm | 66 | 203 | 437 | 80.3 | 428 |
| Pulverizing apparatus 100 Mesh opening 0.196 mm | 53 | 152 | 307 | 51.4 | 214 |
| Vertical roller mill | 22 | 63 | 153 | 26.2 | 60 |

As can be understood from Table 2, fine paper powder having a particle diameter over 100 μm exceeds 80% in the fine paper powder obtained using the pulverizing apparatus 100, and the percentage is increased compared to the case of finely pulverizing the pulp sheet in Example 1. This is conceived that since glassine paper contains sulfite pulp as raw material and the surface is smooth compared to pulp sheet, the glassine paper slips between the stationary blades 111 and the rotary blades 131, and it is difficult to receive the shearing force.

Example 3

In Example 3, a paper cup piece was used as the paper piece. This paper cup piece includes a resin layer composed of polyethylene having a thickness of approximately 0.02 mm on one surface of a pulp paper having a thickness of approximately 0.5 mm. Fine paper powder was obtained in the same way as Example 1 except that paper cup was used. The results are shown in Table 3.

TABLE 3

|  | d10 (μm) | d50 (μm) | d90 (μm) | Over 100 μm (%) | Obtained amount (kg/hr) |
|---|---|---|---|---|---|
| Pulverizing apparatus 100 Mesh opening 0.318 mm | 30 | 140 | 377 | 62.8 | 264 |
| Pulverizing apparatus 100 Mesh opening 0.196 mm | 21 | 105 | 283 | 58.2 | 77 |
| Vertical roller mill | 17 | 71 | 182 | 34.8 | 20 |

As can be understood from Table 3, fine paper powder having a particle diameter over 100 μm exceeds 60% in the fine paper powder obtained using the pulverizing apparatus 100, and the percentage is increased compared to the case of finely pulverizing the pulp sheet in Example 1. This is conceived that since the paper cup piece has a resin layer on the surface and the surface is smooth compared to pulp sheet, the paper cup piece slips between the stationary blades 111 and the rotary blades 131, and it is difficult to receive the shearing force.

EXPLANATION OF REFERENCE NUMERALS

1 . . . coarse pulverizing step, 2 . . . fine pulverizing step, 3 . . . re-fine pulverizing step, 3 . . . second pulverizing step, 4 . . . excluding step, 11 . . . raw material supplier, 12 . . . coarse pulverizing machine, 13 . . . grinding type pulverizer, 14 . . . classifier, 100 . . . pulverizing apparatus, 110 pulverization chamber, 111 . . . stationary blade, 120 . . . rotary shaft 130 . . . rotary blade attaching plate, 131 . . . rotary blade, 140 . . . paper powder feed port, 150 . . . rotation driving unit, 160 . . . screen, 170 . . . accumulation chamber, 180 . . . discharge mechanism, 181 . . . discharge port, 182 . . . suction part, 183 . . . communication passage, 184 . . . opening and closing valve, 185 . . . intermittent operation part

The invention claimed is:

1. A pulverizing apparatus comprising:
   a pulverization chamber which has a plurality of stationary blades at an inner peripheral surface thereof, the plurality of stationary blades extending in an axial direction of the pulverization chamber and being separated by intervals in a peripheral direction of the pulverization chamber;
   a rotary shaft which is rotatably supported by the pulverization chamber;
   a plurality of rotary blade attaching plates fixed to the rotary shaft and separated by intervals in the axial direction of the pulverization chamber;
   a plurality of rotary blades fixed to an outer peripheral surface of the rotary blade attaching plates so as to oppose the stationary blades, and tip ends thereof having space of 0.1 mm or more to 0.5 mm or less between tip ends of the stationary blades;
   a paper powder feed port to which paper powder is fed into the pulverization chamber;
   a rotation driving unit comprising an electric motor connected to the rotary shaft which rotates the rotary shaft so that a peripheral speed of the tip ends of the rotary blades is 19 m/sec or more to 30 m/sec or less; and
   a screen arranged at a lower portion of the pulverization chamber and having a mesh opening of 130 μm or more to 400 μm or less,
   wherein rotation of the rotary shaft by the rotation driving unit causes paper powder to be sheared such that fibers of the paper powder are shortened and pulverized between the stationary blades and the rotary blades.

2. The pulverizing apparatus according to claim 1, wherein the space between the tip ends of the stationary blades and the tip ends of the rotary blades is 0.3 mm or more to 0.5 mm or less.

3. The pulverizing apparatus according to claim 1, wherein the rotation driving unit rotates the rotary shaft so that the peripheral speed of the tip ends of the rotary blades is 25 m/sec or more to 30 m/sec or less.

4. The pulverizing apparatus according to claim 1, further comprising:
   an accumulation chamber in which paper powder pulverized in the pulverization chamber and passed through the screen is accumulated;
   a discharge port formed on one side of the accumulation chamber;
   a suction fan which sucks air inside the accumulation chamber via the discharge port;
   a communication passage which is formed on other side of the accumulation chamber and which communicates an inside of the accumulation chamber and outside;
   an opening and closing valve arranged at the communication passage; and
   an intermittent operation part comprising an air cylinder and a control unit, which opens and closes the opening and closing valve.

5. A method for producing fine paper powder using a pulverizing apparatus including a pulverization chamber which has a plurality of stationary blades at an inner peripheral surface thereof, the plurality of stationary blades extending in an axial direction of the pulverization chamber and being separated by intervals in a peripheral direction of the pulverization chamber, a rotary shaft which is rotatably supported by the pulverization chamber, a plurality of rotary blade attaching plates fixed to the rotary shaft and separated by intervals in the axial direction of the pulverization chamber, a plurality of rotary blades fixed to an outer peripheral surface of the rotary blade attaching plates so as to oppose the stationary blades, tip ends thereof having space of 0.1 mm or more to 0.5 mm or less between tip ends of the stationary blades, a paper powder feed port to which paper powder is fed into the pulverization chamber, a rotation driving unit comprising an electric motor connected to the rotary shaft which rotates the rotary shaft so that a peripheral speed of the tip ends of the rotary blades is 19 m/sec or more to 30 m/sec or less, and a screen arranged at a lower portion of the pulverization chamber and having a mesh opening of 130 μm or more to 400 μm or less, the method comprising,
   a fine pulverizing step for rotating the rotary shaft so that the peripheral speed of the tip ends of the rotary blades is 19 m/sec or more to 30 m/sec or less to cause the paper powder to be sheared such that fibers of the paper powder are shortened and pulverized between the stationary blades and the rotary blades, and obtaining fine paper powder discharged by passing through the screen arranged at the lower portion of the pulverization chamber and having the mesh opening of 130 μm or more to 400 μm or less.

6. The method for producing fine paper powder according to claim 5, comprising a re-fine pulverizing step to obtain fine paper powder with a maximum particle diameter of 25 μm or more to 100 μm or less by pulverizing the fine paper powder obtained in the fine pulverizing step using a grinding type pulverizer.

7. The method for producing fine paper powder according to claim 5, wherein the paper powder is formed of paper having a maximum particle diameter of 1 mm or more to 5 mm or less and having a resin layer on at least one surface thereof.

8. The method for producing fine paper powder according to claim 6, comprising an excluding step for excluding fine paper powder exceeding the maximum particle diameter from fine paper powder obtained in the fine pulverizing step or the re-fine pulverizing step, by using a classifier including a classifier screen having a classifier screen mesh opening corresponding to the maximum particle diameter.

* * * * *